(No Model.)
M. JINCKS.
POTATO OR MANURE FORK.
No. 329,046. Patented Oct. 27, 1885.
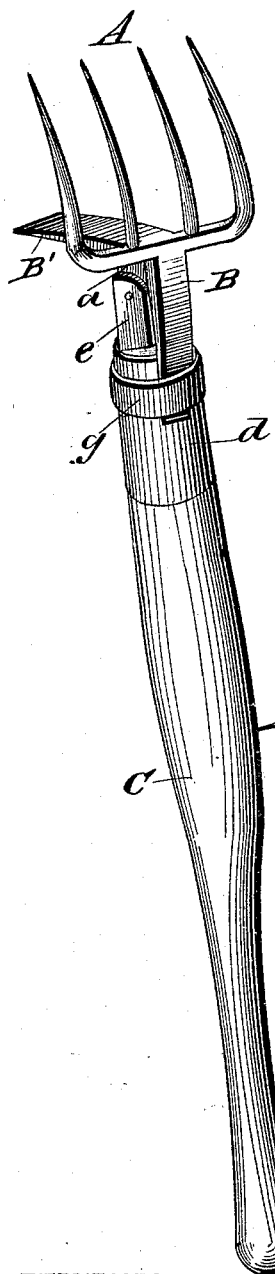
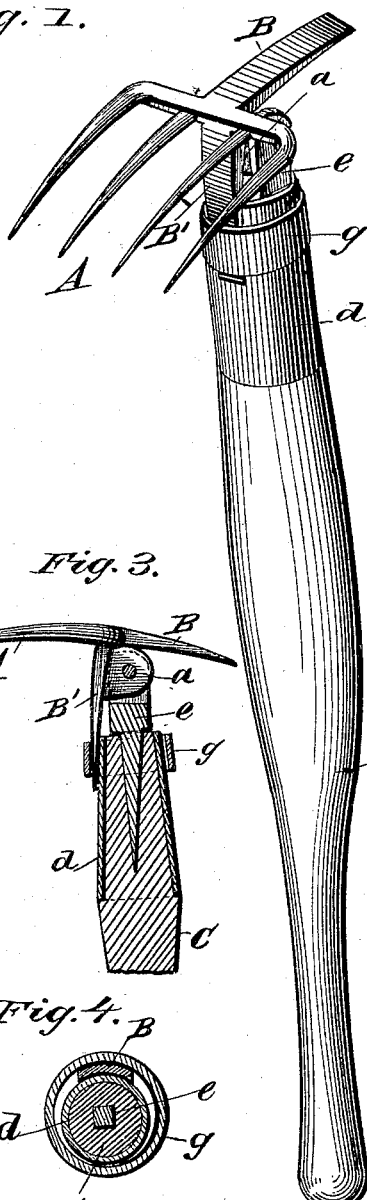
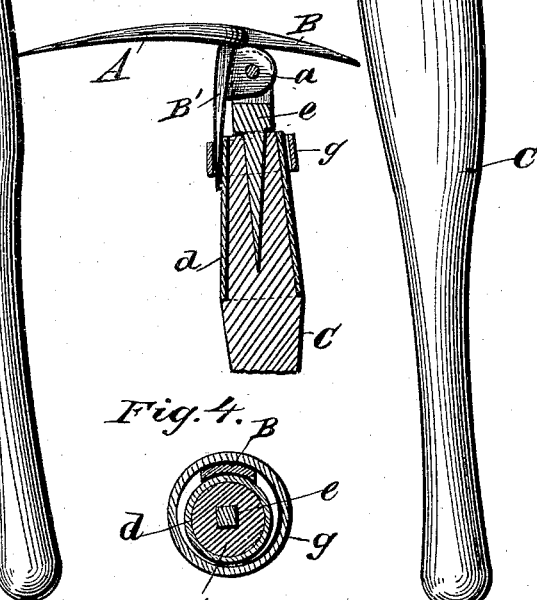
WITNESSES
Phil C Dieterich
W R Keyworth
INVENTOR
Melvin Jincks.
By J H Alexander
Attorney

UNITED STATES PATENT OFFICE.

MELVIN JINCKS, OF CONESUS CENTRE, NEW YORK.

POTATO OR MANURE FORK.

SPECIFICATION forming part of Letters Patent No. 329,046, dated October 27, 1885.

Application filed March 19, 1885. Serial No. 159,403. (No model.)

*To all whom it may concern:*

Be it known that I, MELVIN JINCKS, of Conesus Centre, in the county of Livingston and State of New York, have invented certain new and useful Improvements in Potato or Manure Forks; and I do hereby declare that the following is a full, clear, and exact description thereof, reference being had to the accompanying drawings, and to the letters of reference marked thereon, which form part of this specification, in which—

Figure 1 is a perspective showing the implement in position when used as a manure-fork or for other analogous purposes, and Fig. 2 a perspective showing it when converted into a rake and digger or hoe. Figs. 3 and 4 are sectional details.

The object I have in view is to provide an implement which may readily be adapted to either farm, garden, or stable purposes; and to these ends my invention consists in the peculiar construction of that portion which comprises the rake or fork proper, and in the combination therewith of a pivoted or hinged handle and a slip-ring thereon, all as will be fully understood from the following description, when taken in connection with the annexed drawings.

In order that others may avail themselves of the full benefit of my invention, I will now proceed to describe its construction and mode of operation.

A represents the fork or rake, which is constructed with the two projections B B'. These projections are at or about right angles to each other—that is to say, the projection B forms an extension at the back of the fork or rake, while B' is a similar projection at right angles to B, and on the side of the fork which, when adjusted to form a rake, will lie close upon the end of the handle, as seen in Fig. 2. When the implement is in this position, the projection B' will form a digger or hoe, as seen in Fig. 1. The ends of each of these projections should gradually taper to an edge, and their under side be slightly hollowed out to enable them to lie closely upon the outer end of the handle. Between the projections B B' is a solid extension, a, which is rounded on its face and is also provided with a pivot-hole.

C represents the handle, supplied with ferrule d. e is a metal shank, having its outer end bifurcated, between the prongs of which is securely pivoted the extension a. The handle C should be somewhat enlarged a short distance from the upper end of the ferrule. Before the shank e is secured in place the slip-ring g is placed on the lower end of said handle.

It will now be observed that whether the implement is adjusted to form a rake or fork one of the projections lies upon the handle, and upon which the ring g is slipped, thus firmly holding the tines either at right angles to the handles or in line therewith. The device is provided with two hoe-points for the following reasons: When being used as a fork, Fig. 1, and it is necessary to hoe the material, the hoe-point B' comes into play and the point B serves to secure the fork in position. When the device is used as a rake, Fig. 2, the hoe-point B is in position to be used and the rake is held in position by the point B'. Now, as in both forking and raking a hoe is often necessary the device without the hoe-point B' would be imperfect and much less useful.

I am aware that a blade hinged to a handle so as to be used either as a hoe or a spade has been made in one piece with a pick-point to be used in conjunction with the blade, and that the said blade is secured in its different positions by a slip-ring on the handle.

I am also aware that a fork has been hinged to a handle so that it can be used as a rake. Such I do not broadly claim; but, Having described my invention, what I claim is—

1. As a new article of manufacture, the within-described farm or stable implement, consisting of handle C, ring e, and fork A, said fork being formed integral with two extensions, B B', either of said extensions adapted to serve as a hoe whether the fork is in line or at right angles to the handle, all as specified.

2. The combination of the handle C, ring $g$, and the shank $e$, driven into the ferruled end of the handle and having its outer end bifurcated, with the fork A, having the two hoe-points B B' made in one piece with it and provided with the extension $a$, which is pivoted in the bifurcation of the shank $e$, substantially as specified.

In testimony that I claim the foregoing as my own I affix my signature in presence of two witnesses.

MELVIN JINCKS.

Witnesses:
J. B. THURSTON,
EUGENE S. JEWELL.